US007457781B1

(12) United States Patent
Weaver et al.

(10) Patent No.: US 7,457,781 B1
(45) Date of Patent: Nov. 25, 2008

(54) METHOD AND SYSTEM FOR ENFORCING SIMULTANEOUS USER LICENSES FOR APPLICATIONS RUNNING ON WIRELESS DEVICES

(75) Inventors: Farni B. Weaver, Spring Hill, KS (US); Piyush Jethwa, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 865 days.

(21) Appl. No.: 10/655,650

(22) Filed: Sep. 5, 2003

(51) Int. Cl.
*G06Q 99/00* (2006.01)

(52) U.S. Cl. .............................. 705/64; 705/51; 705/59; 705/65; 705/66; 705/57; 455/405

(58) Field of Classification Search ............. 705/50–59; 455/403
See application file for complete search history.

(56) References Cited

U.S. PATENT DOCUMENTS

| 5,014,234 | A | * | 5/1991 | Edwards, Jr. ................. 726/33 |
| 5,771,347 | A | * | 6/1998 | Grantz et al. ................. 726/31 |
| 5,845,065 | A | | 12/1998 | Conte et al. ................. 395/186 |
| 6,453,305 | B1 | * | 9/2002 | Glassman et al. ............. 705/59 |
| 2001/0046287 | A1 | * | 11/2001 | Hoefig ................... 379/210.01 |
| 2002/0177429 | A1 | * | 11/2002 | Watler et al. ................. 455/405 |
| 2002/0178271 | A1 | * | 11/2002 | Graham et al. .............. 709/229 |
| 2008/0032747 | A1 | * | 2/2008 | Holt et al. ................... 455/563 |

OTHER PUBLICATIONS

Daylight Chemical Information Systems, Inc., *Installing and Administering JavaGrins and Dayutilserver* (Installation and Administration Guide), Daylight Version 4.81, Dec. 20, 2002.
OCLC Distributed Systems, *Site Search License Management*, May 6, 2003.

* cited by examiner

*Primary Examiner*—Jalatee Worjloh

(57) ABSTRACT

A method for allocating a plurality of user licenses for simultaneous use of a software application in a wireless communication system. The method includes negotiating allocation of a single user license over a wireless connection. The single user license is allocated to a mobile device including the software application. The allocation of the single license is tracked with a used license count using an entity in the wireless communication system. The software application is run on the mobile device after allocation of the single user license. The method further includes detecting termination of the wireless connection and, responsive to that detection, starting a first timer included in the mobile device and a second timer operatively associated with the communication system entity. Operation of the software application is halted on expiration of the first timer and the used license count is decremented on the expiration of the second timer.

17 Claims, 4 Drawing Sheets

METHOD AND SYSTEM FOR ENFORCING SIMULTANEOUS USER LICENSES FOR APPLICATIONS RUNNING ON WIRELESS DEVICES

BACKGROUND

I. Field of the Invention

The present invention is directed to enforcing licenses for software applications. More particularly, the present invention is directed to methods and systems for enforcing simultaneous user licenses for software applications in a wireless network.

II. Description of Related Art

Business and individual consumer use of software applications continues to grow. Typically, the use of commercially available software applications requires a license for that use. In fact, it is common that a license to use a software application is purchased, not the actual software application. In this scenario, the software application is provided to the licensee as one of the terms of the license.

In this regard, there are a number of ways that software licenses may be enforced, such that users (business or individual) of such software applications are allocated a license when using a specific software application. One such approach is it to have a license associated with each installed instance of a software application. However, such an approach may be cost prohibitive, particularly for businesses. While a business may have certain software applications installed on numerous computing and/or electronic devices, not all of these applications are run simultaneously. In such a situation, a more cost effective solution may be to license the use of software applications using simultaneous user licenses. For example, a business may have a specific software application installed on one hundred devices, but may only have ten simultaneous user licenses. The total number of simultaneous user licenses corresponds to the number of users that may simultaneously use the specific software application.

Such simultaneous user licenses are typically managed in a network environment using, for example, a license server to allocate licenses to users in response to license requests. If a license is available when such a request is made, it is allocated to the requesting device (e.g., checked out). A user may then use the software application on the device. When the user is done using the software application, the license is unallocated from the user (e.g. checked in) and is again available for allocation to any of the devices (within a specific network) on which the application is installed. The process of checking a license in and/or out is accomplished by communication between the application (or the device on which the application is installed) and the license server.

A license may also be unallocated from a user in other manners. For example, if the application is idle for a certain period of time, an allocated license may "expire" and then be available for incoming license requests. Such "expiration" is typically determined by the application and the license server communicating with one another to determine that a license should be unallocated due to non-use of the application.

With the growth of software applications being used in wireless communication devices, such as mobile phones, personal digital assistants (PDAs), among others, it is desirable to employ software licensing approaches, such as the management of simultaneous user licenses for software applications installed on such wireless devices. However, such an approach is problematic due to the need for communication between the application (and/or wireless device) and the entity (e.g., license server) that manages the simultaneous user licenses. In this regard, a user of a mobile device may become disconnected (intentionally or unintentionally) from a wireless network that includes the entity which manages the simultaneous user licenses. In such a situation, it is not possible for the license server to determine if an application is no longer in use or if an allocated license should be unallocated due to "expiration" (e.g., non-use of the application). Therefore, alternative approaches for managing simultaneous user licenses in a wireless environment are desirable.

SUMMARY

According to an exemplary embodiment, an exemplary method is provided for allocating a plurality of user licenses for simultaneous use of a software application in a wireless communication system. The method comprises negotiating allocation of a single user license of the plurality of user licenses over a wireless connection. When available, the single user license is allocated to a mobile device having the software application stored thereon, where the mobile device runs the software application. The allocation of the single license is tracked with a used license count, where the used license count is maintained by an entity (e.g., such as a server) included in the wireless communication system.

The method further includes detecting the termination of the wireless connection and, in response to that termination, starting a first timer included in the mobile device and a second timer operatively associated with the server. The termination of the wireless connection may be a normal termination (e.g., initiated by a user of the mobile device) or may be an abnormal termination (e.g., due a loss of signal). The method also includes halting the operation of the software in response to expiration of the first timer and decrementing the used license count in response to the expiration of the second timer.

Such a licensing approach is advantageous as it provides for reliably using cost effective simultaneous user licenses for software applications running on mobile (wireless) devices in a wireless network. The exemplary method allows for the efficient management of simultaneous user licenses in the network, including the allocation and deallocation of such licenses.

In another exemplary method for enforcing a plurality of user licenses for a software application running in a wireless communication system, a mobile device is provided that has the software application stored therein and runs the application upon the allocation of a user license. A wireless connection is established between the mobile device and a base station in response to the application being invoked on the mobile device. The mobile device communicates a license request for using the software application to an entity (server) in the communication system via the wireless connection. In response, the server determines if a user license of the plurality of user licenses is available. If a license is available, the mobile device is notified of that availability via the wireless connection. Use of the software application is then allowed on the mobile device and a used license count is incremented in the server.

This method further comprises starting a first timer included in the mobile device and a second timer operatively associated with the communication system entity. Once the timers are started, the wireless connection is terminated. Upon expiration of the first timer, operation of the software application is halted on the mobile device. Further, the method includes decrementing the used-license count in response to the expiration of the second timer.

This method differs from the above described method in that the wireless connection is established to negotiate the allocation of a user license. Once a license is allocated, the wireless connection is terminated. Such an approach may be more cost efficient for a user of the mobile device as the amount of connection time the user is billed for may be reduced.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION

Overview of an Exemplary Wireless Network

Figure 1:
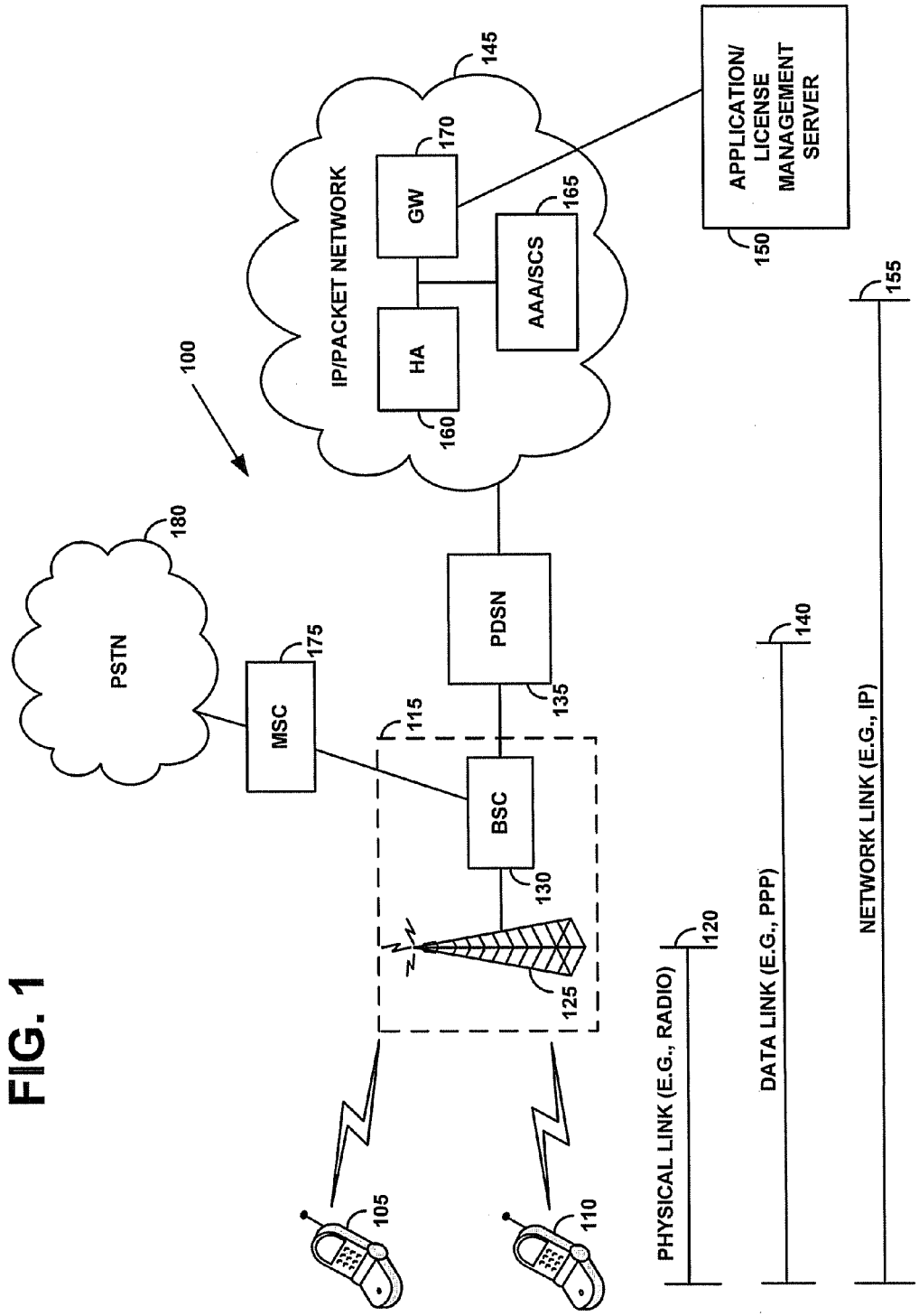
FIG. 1 is a block diagram showing an exemplary wireless communication system in accordance with an embodiment of the invention.

Referring to FIG. 1, a block diagram illustrating a wireless communication network 100, which may be used to implement exemplary embodiments of the invention, is shown. The network 100 comprises mobile devices 105 and 110. The mobile device 105 comprises a personal digital assistant and the mobile device 110 comprises a wireless telephone. These devices are, of course, exemplary, and the invention is not limited to the use of any particular mobile device. The mobile devices 105 and 110 include one or more software applications that operate based on the allocation of a simultaneous user license.

The mobile devices 105 and 110 communicate with a base station 115 over a physical link 120. Any number of techniques for establishing a connection and communicating via the physical link 120 may be used, such as wireless LAN, Bluetooth, infrared, CDMA, or GSM, among other appropriate protocols and/or technologies. The physical link 120 may be termed a physical link as it provides the interface from electrical and radio signals (for the network 100 and the physical link 120), to the physical medium (the mobile devices), such as voice information to a mobile telephone earpiece or signals to a visual display on the mobile device, for example. Such techniques are known to those working in this area and will not be discussed in detail here.

The base station 115 comprises a base transceiver station (BTS) 125, which may also be referred to as a radio tower, or wireless communication antenna. The base station 115 further comprises a base station controller (BSC) 130. The BSC 130 manages the radio resources (incoming and outgoing) for the BTS 125. It will be appreciated that the BTS 125 and the BSC 130 may be integrated or separate entities. For example, a single base station controller may manage the radio resources of multiple base transceiver stations. In this situation, the BSC 130 may be physically separate from BTS 125 for the network 100 shown in FIG. 1.

As is known, the base station 115 is typically coupled with a mobile switching center (MSC) 175, which is further coupled to a public switched telephone network (PSTN) 180. The MSC 175 channels voice and/or other information between the mobile devices 105 and 110 and devices connected with the PSTN 180. For example, the MSC 175 may connect a specific mobile device with a specific landline telephone, so that a user of the mobile device can communicate (such as by conversation) with a user of the landline telephone.

The network 100 further includes a Packet Data Serving Node (PDSN) 135. The PDSN 135 and the mobile devices operate so as to communicate over a data link 140. The data link may comprise, for example, a point-to-point protocol (PPP) link. The PDSN 135, in analogous fashion as the MSC 175 coupled with the PSTN 180, channels data between the mobile devices 105 and 110 and a packet data network 145. In this regard, the mobile devices 105 and 110 may communicate with entities coupled with (or included in) the packet network 145, such as an application/license management server 150, over a network link 155. In this respect, the PDSN 135 acts as a switch for the mobile devices 105 and 110 when interfacing with the packet network 145 in a similar fashion as the MSC acts as a switch for interfacing the mobile devices 105 and 110 with the PSTN.

In an exemplary embodiment, the network link 155 may comprise an Internet Protocol link. Further in an exemplary embodiment, the application/license management server 150 (hereafter "application server") may contain appropriate logic (which may be implemented in software, hardware, firmware or the like) for allocating simultaneous user licenses for the software applications installed on the mobile devices 105 and 110. Such embodiments will be described in further detail below with additional reference to FIGS. 2 and 3.

The wireless network 100 shown in FIG. 1 further comprises a home agent (HA) device 160, an authentication authorization and accounting/service creation system (AAA/SCS) 165 and a gateway (GW) 170. Such entities are known to those working in this area and are used, at least in part, to provide packet data services to mobile devices, such as mobile devices 105 and 110. In this respect, the HA 160 acts as a conduit for the mobile device to communicate with the packet network 145 and the application server 150. This communication may be accomplished using any number of protocols, such as, is for example, the Mobile IP protocol. The Mobile IP protocol is known and is described in various standards documents available from the Internet Engineering Task Force, which is an organized activity of the Internet Society, 1775 Wiehle Ave., Suite 102, Reston, Va. 20190-5108.

Exemplary Methods for Enforcing Simultaneous Licenses

Figure 2:
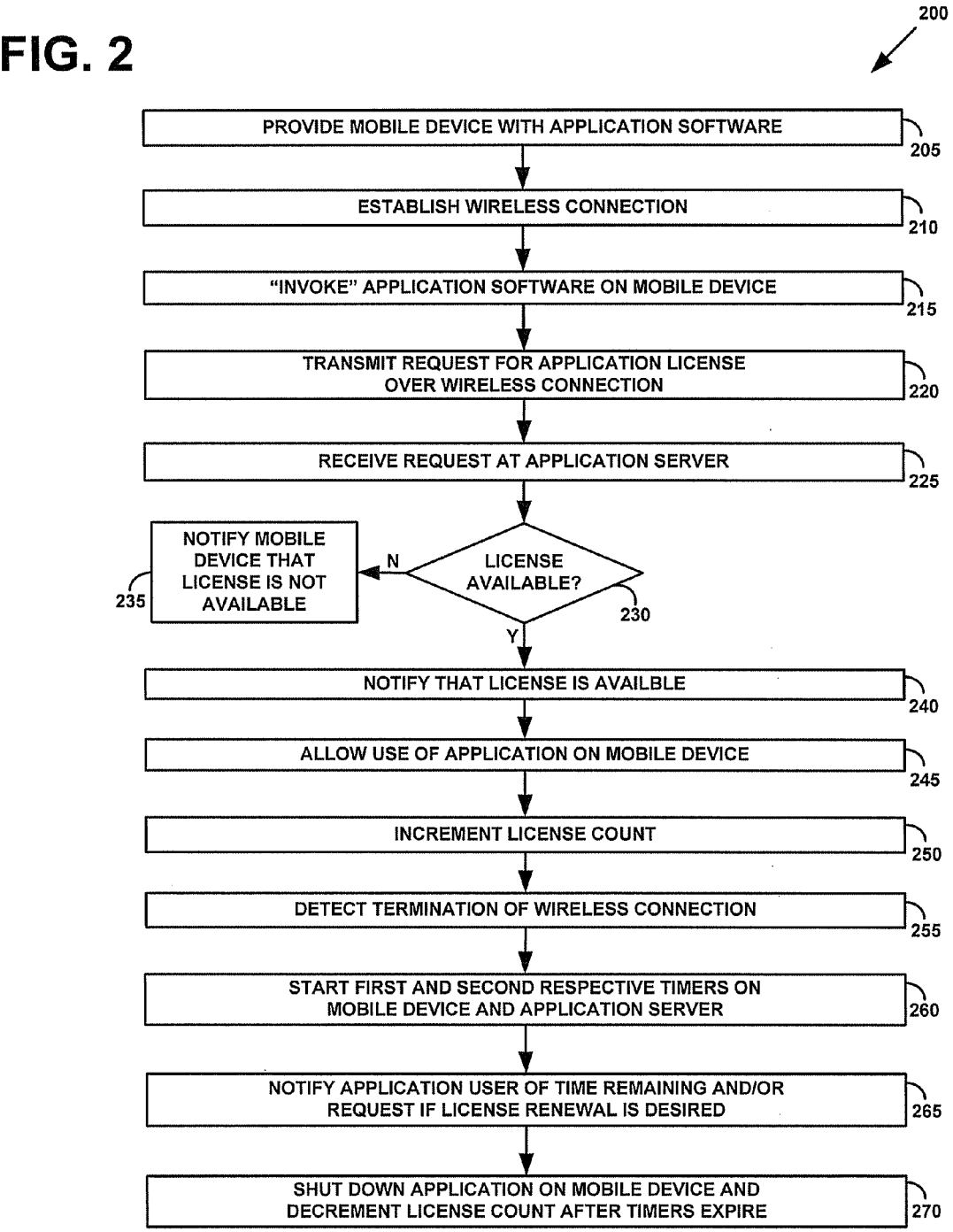
FIG. 2 is a flowchart illustrating a method for enforcing simultaneous licenses in accordance with an embodiment of the invention.

Referring now to FIG. 2, a flowchart illustrating an exemplary method 200 for enforcing simultaneous user licenses is shown. The method 200 will be described herein with reference to FIG. 2 and with further reference to the wireless network 100 depicted in FIG. 1.

At block 205, the method 200 comprises providing a mobile device (such as 105 and/or 110) that includes a software application that is licensed for use with a simultaneous user license arrangement. In certain embodiments, the software application may be installed on the mobile device when it is originally purchased by an end user. In alternative embodiments, the software application may be installed on the mobile device after is it purchased by the end user, such as via a wired or wireless connection.

At block 210, a wireless connection is established between the mobile device (105 and/or 110) and a data network, such as the packet data network 145. In this situation, the wireless connection comprises the physical link 120 (e.g., radio link) between the mobile devices 105 and 110 and the base station 115, the data link (e.g., a PPP link) between the mobile devices and the PDSN 135, and the network link 155 (e.g., IP link) between the mobile devices 105 and 110 and the packet network 145. It is noted that the data link 140 comprises the physical link 120 and that, likewise, the network link 155 comprises the data link 140 and the physical link 120. In this respect, information communicated between the mobile devices (105 and 110) and the packet network 145 may be translated from one format to another during such communication.

Once the wireless connection is established, the software application is invoked at block 215. For certain embodiments, invoking the software application results in a request for a simultaneous user license (hereafter "license request") being communicated to the application server 150 over the wireless connection via the GW 170. Alternatively, a license request may be communicated independent from the invocation of the software application, such as via a custom user interface, for example. In certain embodiments, requesting a license may also result in the software application for which a license is being requested to be communicated to the mobile device (e.g., downloaded), if that application is not already resident on the mobile device. It will be appreciated that communicating the license request to the application server 150 is exemplary, and that such a license request may be communicated to any number of entities in the network 100.

Any number of communication protocols may be used to generate a license request, such as the Session Initiation Protocol (SIP) or Hypertext Transfer Protocol (HTTP), among others. In certain embodiments, the license request may comprise an HTTP 'get' command, which includes information regarding the application for which a license is being requested. As one alternative, the license request may comprise a SIP 'invite' command. Additionally, information about the mobile device from which the license request was generated may also be included with the license request. Such mobile device information may indicate whether a specific device is authorized to run the software application and, thus, indicate whether a license should be allocated. In this respect, the application server 150 may determine whether the device is authorized to run the application. Alternatively, for the network 100, the AAA/SCS 165 may make this determination. For the sake of clarity, the remainder of this disclosure will describe the exemplary methods in the context of the application server 150 receiving and handling license requests. However, it will now be appreciated that the invention is not so limited.

At block 230, in response to receipt of the license request, the application server 150 may execute appropriate logic to determine whether any user licenses of a plurality of simultaneous user licenses is available for allocation to the mobile device that generated the request. In making this determination, the application server 150 may execute logic that simply compares a used license count with a total license count. If the used license count is equal to the total license count, the application server 150 will determine that a user license is not available to be allocated to the mobile device. In this situation, at block 235, the application sever 150 communicates (to the mobile device) that no licenses are available for the application using an appropriate command (e.g., an HTTP or SIP command).

In certain embodiments, the application server 150 may provide license management for any number of software applications that may be installed on mobile devices of the network 100. For example, the application server 150 may manage licenses for word processing, spreadsheet and entertainment (e.g., game) applications, among numerous other applications. For such embodiments, merely tracking a used license count, as described above, may not be an efficient way to manage such licenses.

In embodiments where simultaneous user licenses for multiple software applications are managed by the application server 150, the number of used licenses and the total number of available licenses for each application may be contained in a database on the application server 150 (or another entity in the network 100). For such embodiments, determining whether a user license is available for allocation to a mobile device comprises querying the database to determine the used license count for that application and comparing the used license count with the total number of available licenses for the application. Any number of database structures and queries may be used. For example, a Structured Query Language (SQL) database may be employed and a corresponding SQL query may be used to determine if a license is available for allocation.

If it is determined, at block 230, that a license is available for allocation in response to the license request, the application server 150 communicates, via the network link 155, a message to the requesting mobile device (e.g., 105 or 110) that the license is available. In this regard, the application server 150 may transmit an HTTP 'response' command to indicate license availability. Alternatively, a SIP '200 OK' command may be used to indicate that a license is available. For this situation, the application may be used on the mobile device once the device receives notification that the license has been allocated. Also, the used license count corresponding to the license request is incremented to indicate that a license was allocated in response to the license request. Further, information related to the mobile device that made the license request may be stored in the database.

At block 255, a determination that the wireless connection has been terminated is made. This termination may be a "normal" termination or may be an "abnormal" termination. In this respect, a normal termination is such that termination of the wireless connection is intended (e.g., deliberately initiated by, or using, an entity in the network 100). For example, a normal termination occurs when a user of the mobile device (e.g., 105 and/or 110) indicates that he/she wishes to disconnect the wireless connection (e.g., stop communicating with the base station 115, etc.). Other types of "normal" terminations are, of course, possible.

Alternatively, the termination of the wireless connection may be an "abnormal" termination in that the termination was not intended and/or deliberate. In this respect, an abnormal termination of the wireless connection occurs when the mobile device moves outside a coverage area of the base station 115 (and not into the coverage area of a corresponding base station) or if the communication channel is lost due to interference with the radio link, for example. As with "normal" terminations, other types of "abnormal" terminations exist.

The application server 150 may "detect" the termination of the wireless connection by "subscribing" to a message service included in the PDSN 135. In this respect, the PDSN 135 may include appropriate logic to detect the termination of the wireless connection and communicate a message to the application sever 150 indicating that termination.

The mobile device may also detect the termination of the connection and notify the software application, or notify an associated utility application that is used for user license enforcement. In this regard, a "normal" termination may be indicated directly to the software application (or utility application), while an indication of an "abnormal" termination may be provided indirectly, such as by a radio-frequency (RF) module of the mobile device as a result of the RF module detecting a loss of communication channel with the base station 115.

In response to the determination that wireless connection has been terminated ("normally" or "abnormally"), at block 260, a first timer is started on the mobile device and a corresponding second timer is started on the application server 150. Alternatively, the second timer could be started in the PDSN, or other entity in the packet network 145, and be operatively associated with the application server 150. In this situation, the status of the second timer (e.g., time remaining, expiration) is indicated to the application server 150 by the entity in which the timer is initiated. Such timer information is then used by the application server 150 for license management functions.

The first and second timers may be initiated so as to expire substantially simultaneously (e.g., have the same duration.) Alternatively, the second timer may be initiated with a longer duration than the first timer to ensure that the expiration of the first timer occurs earlier in time. Such a technique reduces the likelihood that the same license will be allocated to more than one mobile device during the same period of time, as will be seen from the description below.

At block 265 the method 200 comprises notifying the user of the amount of time remaining on the first timer (e.g., how long until the software application will be shut down.) Such notifications may be done at the initiation of the timer and/or periodically during the duration of the first timer. The timer, as with other features of the invention, may be implemented in hardware, software and/or firmware.

Additionally, the notification at block 265 may provide the user with the option to renew the simultaneous user license. For example, such a notification may include a user selectable option for renewing the license. If this option is selected by the user, the renewal of the license may be accomplished using the method illustrated in FIG. 4, which is described in more detail below.

At block 270, the method 200 comprises halting operation of the software application on the mobile device in response to expiration of the first timer; and decrementing the used-license count corresponding with the software application in response to the expiration of the second timer. Further, the identification of the mobile device may be removed from the database contained in the application server 150, if such information was stored when a license was allocated to the mobile device.

If the first and second timers are initiated with the same duration, they will expire substantially simultaneously. However, if there is a delay in initiating the first timer relative to the second timer, the possibility exists that the same user license may be re-allocated before operation of the software application is halted on the mobile device for which the wireless connection was terminated. As was indicated above, the likelihood of this occurring may be reduced by initiating the second timer with a longer duration than the first timer to account for such delays in initiating the first timer.

Figure 3:
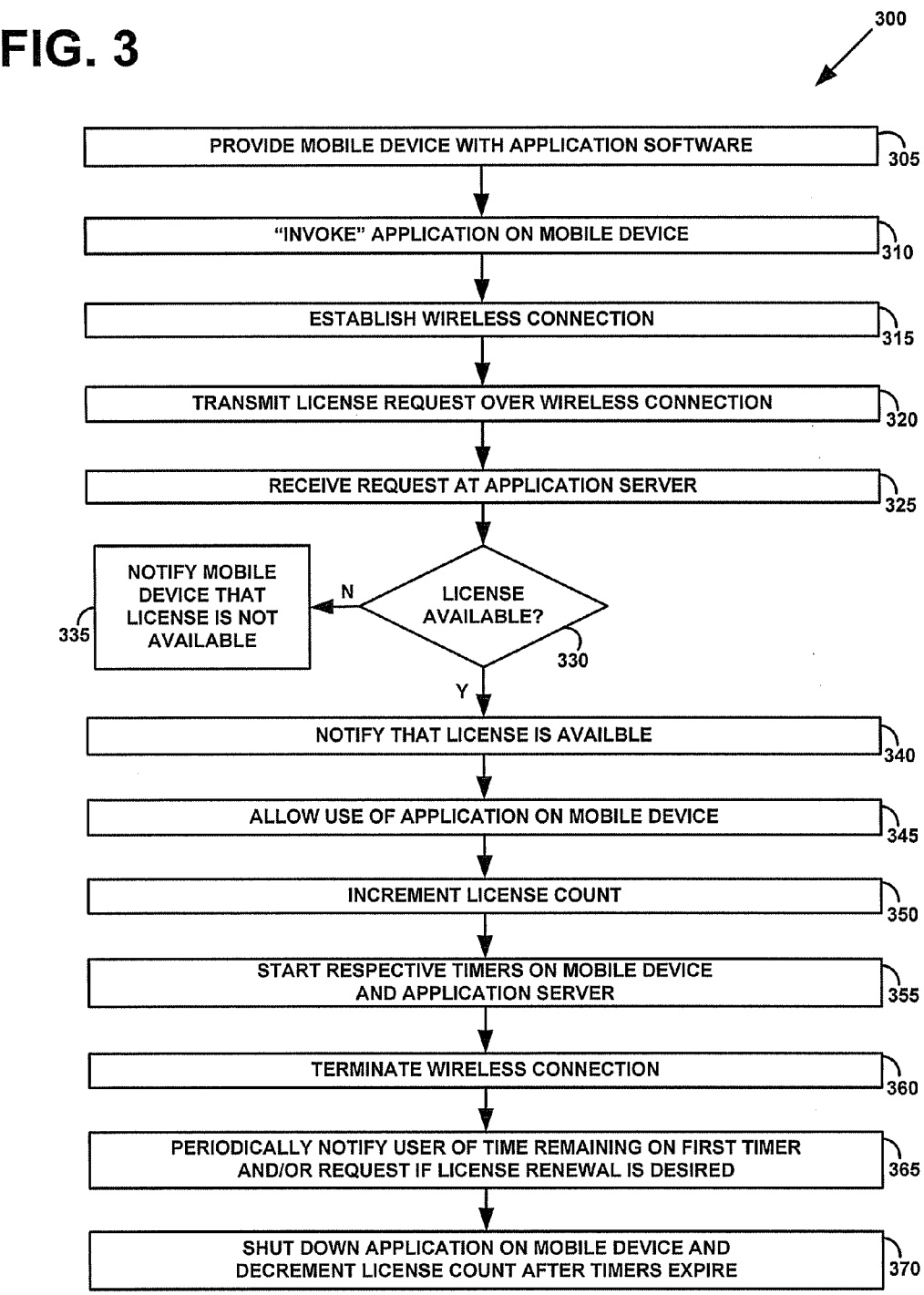
FIG. 3 is a flowchart illustrating an alternative method for enforcing simultaneous user licenses in accordance with an embodiment of the invention and FIG. 4 is a flowchart illustrating a method for renewing a simultaneous user license in accordance with an embodiment of the invention.

Referring now to FIG. 3, a flowchart illustrating another exemplary method 300 for enforcing simultaneous user licenses is shown. The method 300 contains a number of similar aspects as the method 200. For the sake of brevity, those aspects of the method 300 will not be discussed again in detail with reference to FIG. 3. As with the method 200, the method 300 will be described with additional reference to the wireless network 100 shown in FIG. 1.

At block 305, in similar fashion as the method 200, the method 300 comprises providing a mobile device with a software application that is licensed using simultaneous user licenses. At block 310, the software application is invoked on the mobile device and a wireless connection is established in response to the invocation of the application at block 315. In this respect, the wireless connection is established to request a user license for the application. Once the wireless connection is established, the allocation of a user license is carried out at blocks 320-350 of the method 200 in a similar fashion as blocks 220-250 of the method 200 shown in FIG. 2. For brevity, this process will not be discussed in detail again here.

At block 355, respective first and second timers are started on the mobile device (e.g., 105 or 110) and the application server 150. These timers provide the same function as the timers described with respect to the method 200 above. After the first and second timers are started, the wireless connection is normally terminated at block 360. Thus, for the method 300, the wireless connection is established for the purpose of obtaining a user license to operate the software application on the mobile device for a predetermined period of time (e.g., the duration of the first and second timers.)

At block 365, a user of the mobile device is periodically notified of the time remaining until the expiration of the first timer (and shutdown of the application.) At block 370, operation of the application is halted on the mobile device in response to the expiration of the first timer and the used license count (e.g., in a database in the application server 150) is decremented in response to expiration of the second timer, in similar fashion as was described above with respect to the method 200. As with the method 200, a user selectable option to renew the simultaneous user license may also be provided as part of the notification performed at block 365. One such approach for renewing a license will now be discussed with reference to FIG. 4.

Figure 4:
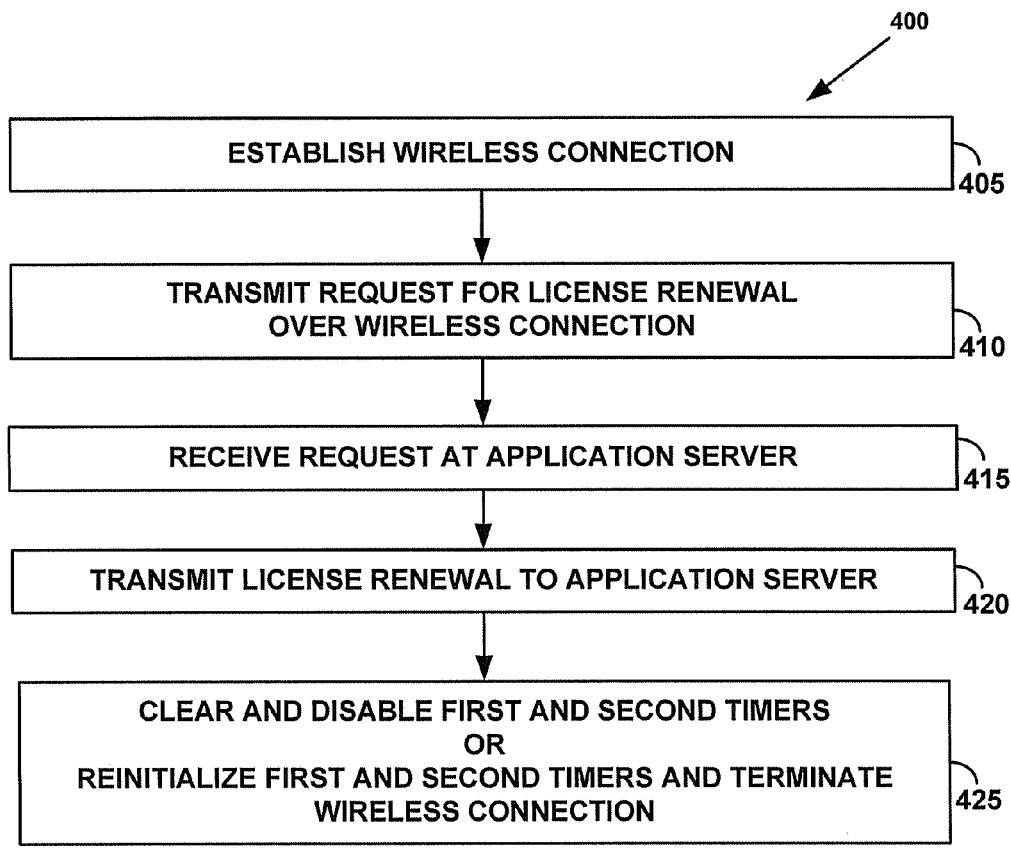

FIG. 4 is a flowchart illustrating an exemplary method 400 for renewing a simultaneous user license for an application running on a wireless (mobile) device. Such a method may be performed in response to a user indicating that license renewal is desired, as described above with respect to FIGS. 2 and 3. Alternatively, such a method may be performed periodically during the use of an application on a mobile device. For example, periodic renewals may be performed while a user is actively using the application. In this regard, the mobile device and/or the application would contain appropriate logic to effect renewal of the license in cooperation with, for example, an application/license management server. The method 400 assumes that the wireless connection over which allocation of the license was accomplished has been terminated, either normally or abnormally.

At block 405, referring also to FIG. 1, a wireless connection is established between the mobile device (105 or 110) and the application/license management server 150. As was discussed above, the wireless connection may be established in response to a user selecting a renewal option or, alternatively, may be established as result of logic for renewing the simultaneous user license being executed on the mobile device. After the wireless connection is established, the mobile device transmits a license renewal request at block 410. Such a renewal request may be a command from an appropriate communication protocol, such as HTTP or SIP, for example. At block 415, the renewal request is received at the application server 150 and a license renewal is transmitted to the mobile device (105 or 110) over the wireless connection at block 420. As, with the renewal request, the license renewal may be communicated using a command from an appropriate communication protocol.

After renewal of the simultaneous user license is accomplished, the first and second timers (included in the mobile device and, depending on the embodiment, the application server 150 may be cleared and disabled while the wireless connection is active. For such embodiments, the first and second timers would be reinitialized if the wireless connection was terminated again (e.g., abnormally), such as in the method 200. Alternatively at block 425, the first and second timers may be reinitialized and the wireless connection terminated normally, such as in the method 300.

CONCLUSION

Exemplary arrangements of the present invention have been described herein. It will be appreciated, however, that those skilled in the art will understand that changes and modifications may be made to these arrangements without departing from the true scope and spirit of the present invention, which is defined by the following claims.

We claim:

1. A method for enforcing a plurality of user licenses for a software application in a wireless communication system comprising:
   providing a mobile device having the software application installed thereon;
   establishing a wireless connection between the mobile device and a data network;
   communicating a license request for use of the software application from the mobile device to an entity in the communication system via the wireless connection;
   responsive to the license request, determining that a user license of the plurality of user licenses is available;
   via the wireless connection, notifying the mobile device that the user license is available;
   responsive to the notification that the user license is available, running the application on the mobile device;
   incrementing a used-license count contained in the communication system entity;
   determining that the wireless connection has been terminated, and responsively starting a first timer included in the mobile device and a second timer operatively associated with the communication system entity;
   halting operation of the software application on the mobile device in response to expiration of the first timer; and
   decrementing the used-license count in response to the expiration of the second timer.

2. The method of claim 1, wherein the software application is installed on the mobile device prior to delivery to an end user.

3. The method of claim 1, wherein the software application is installed on the mobile device by communicating the application to the mobile device via the wireless connection.

4. The method of claim 1, wherein the data network comprises a packet data network.

5. The method of claim 1, wherein the wireless connection comprises:
   a radio link;
   a data link; and
   a network link.

6. The method of claim 5, wherein the network link comprises an Internet Protocol network link.

7. The method of claim 5, wherein communicating the license request is accomplished via the network link.

8. The method of claim 7, wherein the license request comprises one of an HTTP "get" command and a SIP "invite" command.

9. The method of claim 8, wherein notifying the mobile device that the license is available comprises communicating one of an HTTP "response" command and a SIP "200 OK" command to the mobile device from the communication system entity.

10. The method of claim 1, wherein determining whether the user license is available comprises:
    querying a database to determine the used license count; and
    comparing the used license count with a total number of licenses included in the plurality of user licenses.

11. The method of claim 10, wherein querying the database comprises executing a Structured Query Language query.

12. A method for enforcing a plurality of software licenses for a software application in a wireless network comprising:
    providing a mobile device with the software application installed thereon;
    in response to invocation of the application, establishing a wireless connection between the mobile device and a data network;
    transmitting a license request from the mobile device over the wireless connection to an application server;
    receiving the license request at the application server;
    determining, with the application server, if a license of the plurality of licenses is available;
    communicating a reply from the application server to the mobile device, notifying the mobile device that the license of the plurality is available;
    running the application on the mobile device;
    incrementing a used-license count corresponding to the plurality of licenses, the used-license count being maintained in the application server;
    detecting termination of the wireless connection, and responsively initiating first and second timers on, respectively, the mobile device and the application server;
    terminating operation of the application on the mobile device in response to expiration of the first timer; and
    decrementing the used license count in response to the expiration of the second timer.

13. The method of claim 12, wherein termination of the wireless connection comprises normal termination of the wireless connection.

14. The method of claim 12, wherein the wireless connection comprises:
    a radio link;
    a data link; and
    a network link.

15. The method of claim 12, further comprising periodically notifying a user of an amount of time remaining until expiration of the first timer.

16. The method of claim 12, further comprising periodically renewing the license of the plurality of licenses while the application is in use.

17. The method of claim 16, wherein periodically renewing the license of the plurality of licenses comprises:
    establishing a new wireless connection;
    transmitting a renewal request from the mobile device to the application server via the new wireless connection;
    receiving the renewal request at the application server;
    transmitting a license renewal from the application server to the mobile device via the new wireless connection; and
    terminating the new wireless connection and reinitializing the first and second timers.

* * * * *